June 20, 1961  R. N. HARTZELL  2,989,126
GOVERNOR AND METHOD OF SYNCHRONIZING ENGINES
Filed Oct. 28, 1958  2 Sheets—Sheet 1
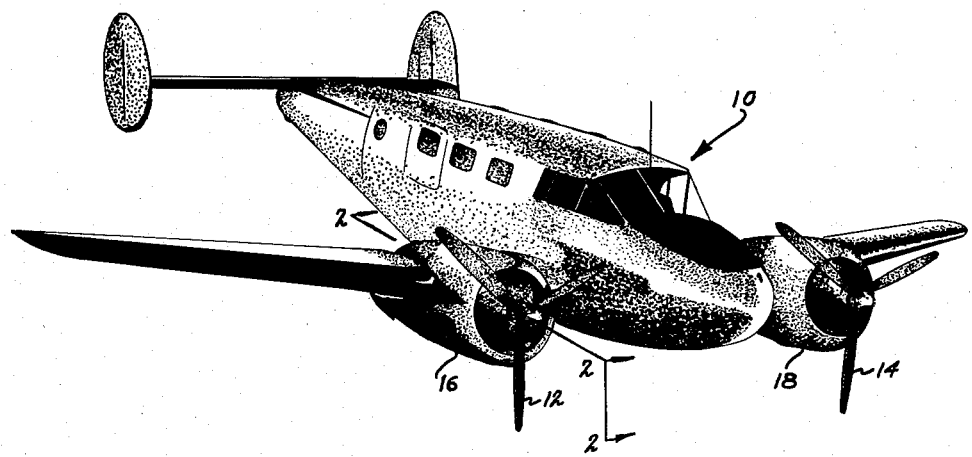
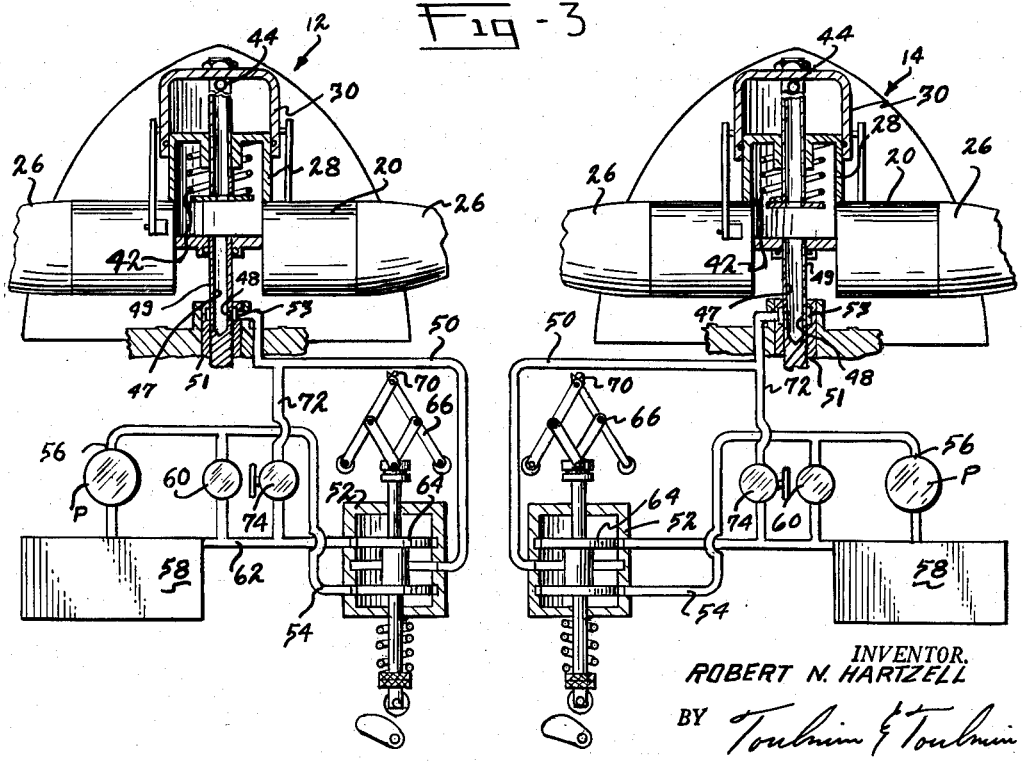
INVENTOR.
ROBERT N. HARTZELL
BY
ATTORNEYS June 20, 1961 R. N. HARTZELL 2,989,126
GOVERNOR AND METHOD OF SYNCHRONIZING ENGINES
Filed Oct. 28, 1958 2 Sheets-Sheet 2
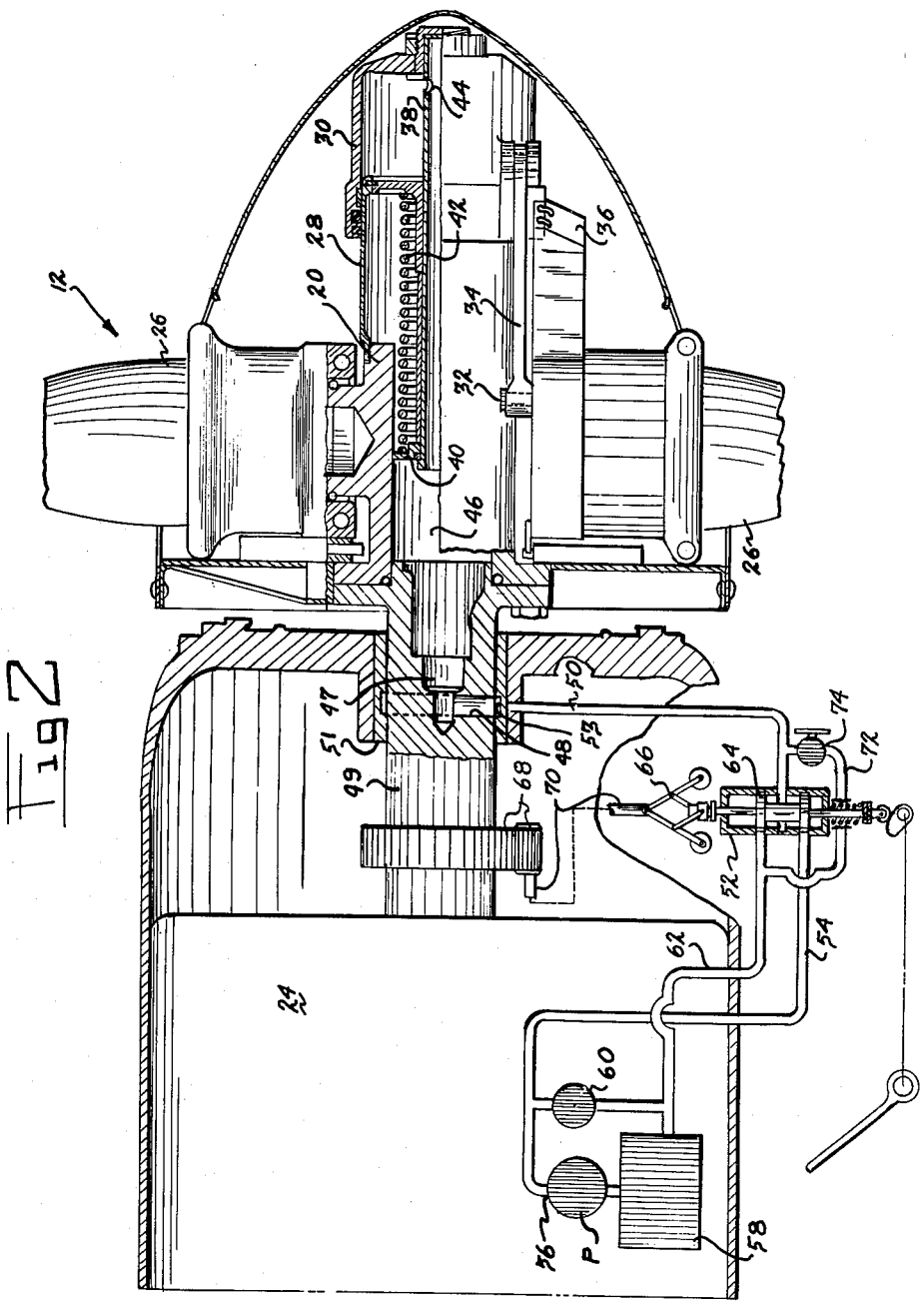
INVENTOR.
ROBERT N. HARTZELL
BY
ATTORNEYS United States Patent Office 2,989,126
Patented June 20, 1961

2,989,126
GOVERNOR AND METHOD OF SYNCHRONIZING ENGINES
Robert N. Hartzell, Piqua, Ohio, assignor to Hartzell Propeller, Inc., Piqua, Ohio
Filed Oct. 28, 1958, Ser. No. 770,078
2 Claims. (Cl. 170—135.29)

This invention relates to the control of adjustable pitch airplane propellers, and in particular to a control for effecting synchronization of the engines of a multiple engine aircraft through control of the adjustable pitch propellers driven thereby.

Most aircraft, other than the smallest planes have more than one engine and it is customary for each engine to drive a propeller, usually directly, and for the engine speed to be controlled by adjusting the pitch of the propeller driven thereby within predetermined limits within the cruising range of the propeller. Such propellers, which make up the bulk of the propellers presently used are referred to as constant speed propellers with there being automatic controls associated with the propellers to vary the pitch thereof when the driving engine changes speed. Thus, a reduction in engine speed would be accompanied by a reduction in propeller pitch tending to reduce the load on the motor while an increase in engine speed would be accomplished by increased propeller pitch to increase the load on the engine, thereby causing the engine to run at substantially constant speed. While the running of the engine at substantially constant speed is important for obtaining efficient operating conditions, it is equally important in the case of multiple engines substantially to synchronize the engines during normal operation thereby to avoid establishing dangerous vibrations in the airplane and to eliminate annoying vibration "beat" which would accompany the operation of two engines of this nature under load at slightly different speeds. Furthermore, with the engines synchronized the propellers driven thereby would be at substantially the same pitch thus producing uniform thrust on the plane and also provide for equal changes of pitch in the propellers upon any adjustment thereof.

Having the foregoing in mind, it is a primary object of the present invention to provide a control arrangement for the engines of the multiple engine aircraft in which the several engines of the aircraft can be substantially exactly synchronized at normal operating speed regardless of slight differences in structure of the individual propeller control mechanisms, and differences in engine oil leakage.

Another object of this invention is the provision of a method and apparatus for compensating for differences in airplane governor mechanisms and the control structure of adjustable pitch airplane propellers thereby to permit substantially exact synchronization of the engines driving the propellers through control of the pitch of the propeller.

A particular object of this invention is the provision, in a hydraulic control system for variable pitch propellers of a method and apparatus for compensating for leakage and the like in the hydraulic control systems and particularly in connection with leakage at the engine bearings, and which leakage will vary from one propeller and its control system to another.

These and other objects and advantages will become more apparent upon reference to the drawings in which:

FIGURE 1 is a perspective view more or less diagrammatically illustrating a multiple engine aircraft, in this case the aircraft having two engines;

FIGURE 2 is a partial longitudinal section through one of the propellers indicated by cutting plane 2—2—2 on FIGURE 1; and FIGURE 3 is a diagrammatic view illustrating the adjusting mechanism for the propeller, the individual governors for the propellers, and the hydraulic circuits interconnecting the governors and the adjusting mechanism.

Referring to the drawings somewhat more in detail, the airplane 10 in FIGURE 1 is provided with two propellers 12 and 14 each having its individual drive engine which may be mounted in the engine nacelles 16 and 18.

Each of the propellers 12 and 14 is constructed as illustrated in FIGURE 2 wherein there is a propeller hub 20 bolted to output shaft 22 of engine 24. Each blade 26 of the propeller is rotatably mounted on hub 20 for rotation about the longitudinal axis of the blade whereby the pitch of the propeller can be adjusted.

For adjusting the pitch of the propeller, hub 20 has attached thereto a stationary cylinder 28 and slidably mounted thereon is a piston 30. Piston 30 is connected with an offset pin 32 on each propeller blade by a link 34 so that reciprocation of the piston on the cylinder will cause adjustment of the pitch of the propeller blades. According to the construction of the propeller illustrated, each blade also has mounted thereon a counterweight 36 which is effective for urging the propeller blades towards increased pitch position while the propeller is rotating, at least while the blades are in cruising pitch range.

Piston 30 has connected thereto a tube 38 extending slidably through the end of cylinder 28 and having a collar 40 on its inner end between which collar and the underneath side of the cylinder head there bears one or more compression springs 42. The springs 42 are effective for urging the piston 30, and through links 34, the blades 26 toward feathered position. Reduction of the propeller pitch from feathered position is accomplished by a supply of pressure fluid into piston 30 which is conveyed thereto through port 44 from the inside of tube 38. The left end of tube 38 opens into a cavity 46 that communicates with passage 47 in the engine output shaft 49. Shaft 49 is journalled in bearing 51 and passage 47 communicates through hole 48 and groove 53 with conduit 50 leading to the service port of governor control valve 52.

Governor control valve 52 has a pressure inlet port connected with a conduit 54 leading to the discharge side of a pump 56. The suction side of pump 56 is connected with sump 58 which may be the sump of the engine 24. A control valve as indicated at 60 maintains the discharge pressure of pump 56 substantially constant over a relatively wide range of engine speeds.

Governor control valve 52 also has an exhaust port connected by conduit 62 with sump 58.

The movable valve spool 64 of the control valve is constructed so that in one position it substantially closes off the pressure and exhaust ports of the control valve thus preventing any substantial flow of fluid in either direction through conduit 50. Movement downwardly of the control valve member from this position would serve to connect conduit 50 with conduit 54 for a supply of pressure fluid to conduit 50 whereas movement upwardly of the control valve member from the said position would connect conduit 50 with exhaust conduit 52 thus permitting fluid to flow from conduit 50.

The adjustment of the control valve member 64 may be accomplished by a fly ball governor 66 driven from the engine drive shaft as by gear 68 and shaft 70.

The governor mechanism is so adjusted that the control valve member is in or near its neutral position as illustrated, when the engine is operating at the desired speed. However, since there is always some leakage associated with hydraulic mechanisms having relatively movable parts regardless of how closely fitted together these parts are, it is necessary for there to be some continuing supply of pressure fluid from conduit 54 to conduit 50 to maintain the propeller in any adjusted position. In particular there is leakage at bearing 51 which varies widely for different engines and can amount to several gallons of oil per minute. Since the amount of such leakage for each propeller and engine will differ from that of every other propeller and engine, and since the leakage within each governor control valve will differ from that of every other valve, it follows that each governor control valve will occupy a slightly different position from any other control valve maintaining the proper supply from its presure conduit to make up for the various leakages and slippages in the pertaining hydraulic control circuit. A different position of the governor control valve member, in turn, means a different position of the fly ball governor, and this, in its turn, requires a different engine speed. Accordingly, when several engines are operating with supposedly identical propellers attached thereto and supposedly identical governor control mechanisms associated therewith, there is actually sufficient difference in the leakage and slippage of the individual hydraulic control circuits pertaining to the propeller, and the engine bearings and the governors, that the engines will be substantially out of synchronism at cruising speed. This can be compensated for to a degree by effecting some adjustment of the fly ball mechanisms but this is difficult to accomplish and is only effective for an extremely limited range of engine speeds. Sudden increases or decreases in load on the engines, as when the plane is climbing or descending or when it hits air pockets or the like, will cause the engines to drift out of synchronism.

I have found, however, that compensation for the varying leakages that occur in the governor mechanisms, engine bearings and propeller structure can be had by simply introducing into each hydraulic circuit controlled leakage or slippage which can be adjusted so that each governor control valve is making up about the same amount of leakage or slippage as every other control valve whereby all of the valves will be positioned alike; the fly ball governors will occupy like positions, and the engines will run at the same speed.

As illustrated in FIGURE 2 there is connected between each conduit 50 and the exhaust conduit 62 associated with the pertaining governor control valve, a by-pass conduit 72 having therein an adjustable choke valve 74 which may be, for example, a needle valve.

The arrangement for two engines is illustrated in FIGURE 3 wherein the parts pertaining to the engines have the same numerals as those utilized in FIGURE 2.

When the governor mechanisms of the propellers of a multiple engine aircraft are provided with the adjustable by-pass of the present invention, it becomes quite simple to adjust the adjustable choke or needle valves to bring the engine into substantially precise synchronization at normal operating speed. Furthermore, the synchronization will be maintained through a substantial range of engine speeds which is apt to be encountered during operation of the engines from take-off to landing.

It will be understood that the precise governor controlled valve mechanism illustrated is only diagrammatically shown and that the valve mechanisms could be of the follow-up servo-motor type and that manual adjustment of the pitch of the propeller blades could also be had, all without departing from the principle of the present invention which turns on the introduction of the controlled leakage path into the control systems between the governor controlled valves and the pitch adjusting mechanisms.

It will be understood that this invention is susceptible to modification in order to adapt it to different usages and conditions; and, accordingly, it is desired to comprehend such modifications within this invention as may fall within the scope of the appended claims.

I claim:

1. In an airplane propeller structure, a pair of engine driven propeller blades, each of said propeller blade structures comprising pitch adjustable mechanism for automatically adjusting the pitch of the propeller blade when the engine driving the same changes speed whereby the engine runs at substantially constant speed, said pitch adjustable mechanism comprising a cylinder and piston slidably mounted therein which is operatively connected to the propeller blade for adjustment of the pitch, spring means urging said piston in one direction and hydraulic fluid actuated mechanism for moving said piston in the opposite direction and against the action of said spring, a source of fluid supply comprising a sump tank, a main conduit line including a discharge line for connecting said sump tank with said hydraulic fluid actuated mechanism, a pump in the main conduit line for pumping fluid from said sump tank to said hydraulic fluid actuated mechanism to operate said pitch adjustable mechanism, a governor control valve in said main conduit line and connected to the discharge side of said pump and to said discharge line for controlling the flow of fluid to said hydraulic fluid actuated mechanism through said discharge line, a by-pass conduit connecting said discharge line between said control valve and said hydraulic fluid actuated mechanism to said sump tank and by-passing said control valve, and an adjustable needle valve in said by-pass conduit for regulating the flow of fluid from said pitch adjustable mechanism to exhaust, whereby fluid leakage in the hydraulic circuit of the two engine driven propeller structures is equalized so that the two engines driving the pair of propellers are maintained in substantially synchronization at normal operating speeds.

2. An airplane propeller structure as set forth in claim 1, wherein the engine driven mechanism includes an output shaft and bearing journal means therefor, said propeller blade structure being mounted on said shaft, and said discharge line being connected to said bearing journal and said by-pass conduit whereby to compensate for fluid leakage at said bearing.

References Cited in the file of this patent

UNITED STATES PATENTS

| 2,473,697 | Annesley | June 21, 1949 |
| 2,557,679 | Nichols | June 19, 1951 |

FOREIGN PATENTS

| 773,065 | Great Britain | Apr. 17, 1957 |